3,165,389
FILTERING DEVICE
Walter O. Vedder, Hagerstown, Md., assignor, by mesne assignments, to The Pangborn Corporation, Hagerstown, Md., a corporation of Delaware
Filed Apr. 19, 1962, Ser. No. 188,659
5 Claims. (Cl. 55—304)

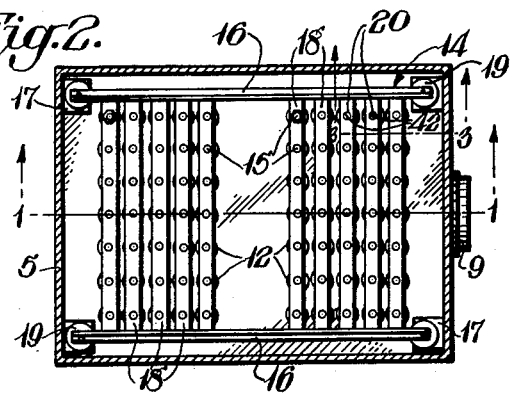
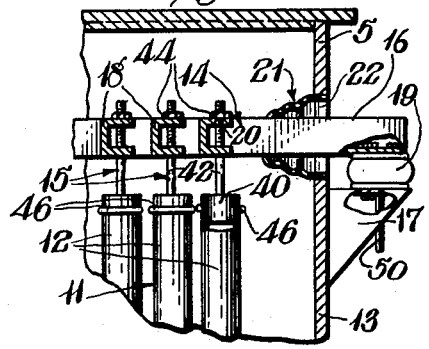
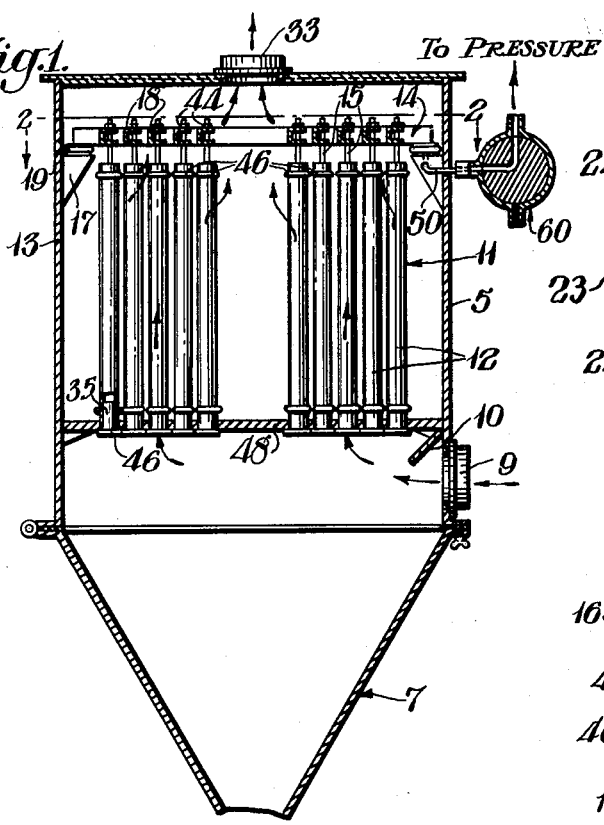
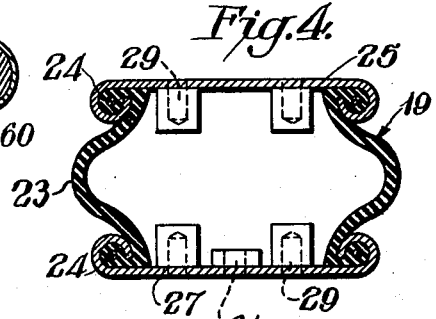
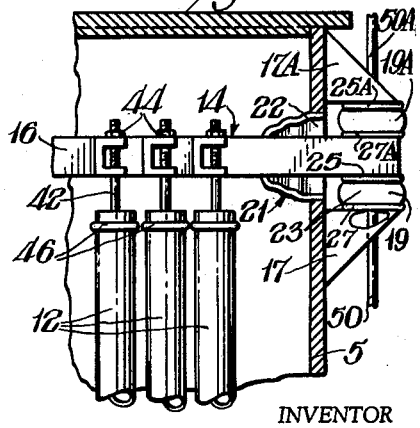

The present invention relates to a cleaning device. More specifically, to a filtering device for the removal of particulate matter from gaseous material.

It is generally known that particulate material such as dust may be conveniently removed from air or other gasses by simply passing the gases through porous cloth filters. Such filtering elements are relatively inexpensive, easy to use, and remarkably efficient. Unfortunately, filtering elements of this type tend to become clogged, hindering the passage of gas through the device and requiring a higher pressure differential for the gas to be moved through at an adequate rate. As a result, various forms of cleaning arrangements have been developed to remove the collected dust and the like as the filters are used.

It is an object of the present invention to provide an improved cleaning arrangement for these filters.

The above and other objects are accomplished in accordance with the present invention by providing a filter flexing assembly which is free of working joints.

The details of the present invention will become more clearly apparent by referring to the accompanying drawings wherein:

FIG. 1 represents a vertical section of one embodiment of the invention;

FIG. 2 is a sectional view taken along lines 2—2 of FIG. 1;

FIG. 3 is a fragmentary detail of a modified embodiment;

FIG. 4 is a sectional view of a supporting element of the constructions of FIGS. 1–3; and FIG. 5 represents an enlarged fragmentary detail of a modification of the invention showing a double air bag arrangement.

In FIG. 1 is shown a filter device having a housing 5 equipped with hopper 7, gas inlet port 9, baffle 10, floor 48, gas outlet port 33, and filtering elements 11 in the form of fabric filter tubes 12 supported at their tops from movable frame 14 by attachments 15. These attachments can be of any type such as shown for example in U.S. Patent 2,667,233, granted January 26, 1954. Movable frame 14 is, in turn, supported on brackets 17 by means of resilient gas cushions 19.

Movable frame 14 consists of principal bars 16 running lengthwise of the housing and a plurality of secondary bars 18 connected between the principal bars and having holes 20 for securing the tubes 12.

In the figures the tubes have their upper ends secured to the secondary bars 18 by means of cylindrical shaped heads 40 (ref. FIG. 3) which can be of metal or plastic construction carrying upwardly extending rods 42 that project through the holes in bars 18 and are kept from falling out by nuts 44. Each tube can be held by a pair of nuts jammed against opposite faces of the bars 18 or of a portion of said bar, or, as an alternative construction, a single nut can be used with each bar to merely hold each tube under tension. Such a single nut modification is desirable since it simplifies the installation of the tubes as well as their removal for maintenance purposes and the like. Clamps 46 can be used to securely anchor the upper ends of the tubes around the heads 40.

The lower end of tubes 12 can be conveniently clamped by clamps 46 to a plurality of open circular flange extensions 35 of a perforated floor piece 48. Each flange is arranged around a perforation and may be conveniently secured to floor 48 by welding, bolting, or can be cast together with the floor piece as a unit. Floor piece 48 is, in turn, secured to housing 5 to effect a substantially air tight seal by welding or by bolting thereto.

An alternative securing arrangement for tube 12 is shown in United States Patent 2,143,664, granted January 10, 1939, in which springy rings are sewn into a hem at the lower end of tube 12 and the springy ends are pushed through perforations in a floor piece. For this purpose, each hole can be a little smaller in diameter than the normal size of the ring, so that the ring must be sprung into the hole and will then expand to securely anchor the bag hem against the margin of the hole.

Each of the passageways 31 in the individual cushions connects with a supply conduit 50 by means of which the pressure within the cushions can be controlled, using a source of pressure or suction or both.

The lower end of hopper 7 is closed as by a trap door or revolving door type closure to permit withdrawal of the solids that collect in the hopper.

In FIG. 3 is shown a different arrangement of the invention in which the cushion-holding brackets 17 are externally mounted on side wall 13 of the housing and the principal frame bars 16 are elongated far enough to also extend out of the housing through openings 22. Flexible boots 21 or similar seals prevent leakage through such openings. A typical cushion in accordance with the present invention is shown in FIG. 4, although others can be used.

The cushion of FIG. 4 has a generally cylindrical suspension element 23 of flexible material such as rubber with or without a tire cord type of skeleton, and metal heads 24 securely gripped between an upper plate 25 and a lower plate 27. Wells 29 are provided in the plates as by welding for the purpose of threaded attachment to supporting bracket 17, and a passageway 31 is provided for removing or adding acuating fluid to the interior of the cushions.

In FIG. 5 is shown a modification of the arrangement of FIG. 3 in which opposing gas cushions 19 and 19A are mounted on either side of frame bar 16, between supporting brackets 17 and 17A. This arrangement provides a convenient means for varying the frequency and amplitude of longitudinal displacement of the fabric tubes during the cleaning cycle.

In operation a stream of particle-laden gas such as dusty air is introduced through intake port 9 so that it passes through filtering elements 11. In such passage the particles suspended in the gas are trapped on the inner surfaces of the fabric tubes, and particle-free gas is discharged through gas outlet port 33. When so many particles have collected on the inner surfaces of the filter tubes that the flow of gas is diminished, the tubes are readily and effectively rejuvenated by merely changing the pressure in the air cushions, preferably a multiplicity of times in fairly rapid sequence. By way of example, a three-way valve 60 (ref. FIG. 1) can be connected to conduit 50 so that it can either expose the conduit to a source of pressurized air as from a high-pressure storage tank, or it can open conduit 50 to the external atmosphere. The three-way valve can then merely be shifted between the above two positions.

For the purpose of the present invention, about three pressure pulses per second for a period of about ten to thirty seconds' duration is generally found sufficient. It is recognized, however, that the maximum shaking frequency of the device is determined largely by the speed with which the supporting gas cushions 19 can be vented to the atmosphere. This, in turn, depends largely upon the size of the fittings and valves and the combined weight of shaker frame and tubes supported by the cushions.

The term "natural frequency" as applied to the invention refers to the number of cycles (i.e. vented to full to vented) that the supporting cushions can make in a given period without employing outside forces to hasten the exhaustion of gases from the supporting cushions. In the present case, the natural frequency generally falls within the range of about 100 to 200 cycles per minute. If external means for increasing the vent rate are employed, however (ref. FIG. 5), the frequency may be varied substantially outside of this range.

When the device is in operation, the effect of rapid pressure variation within the supporting cushions causes the upper frame 14 to move in a vertical reciprocal motion, causing filter tubes 12 to alternately stretch and relax. The stretching is preferably restricted to a longitudinal displacement of about .4% to .8% of the tube length. In a preferred 120 inch tube, this requires a stroke substantially within the range of about one-half inch to one inch. Such flexing is found to rapidly loosen the particles collected on the inside surfaces of the tube and permits the particles to fall into hopper 7.

During the cleaning cycle, the device is conveniently shut down by temporarily closing port 33, if an exhaust arrangement is employed or by closing port 9 if positive pressure is used. Such a valving arrangement is not shown in the figures, however, a number of suitable commercial valves are available for this purpose.

A shut down may be avoided and a reversal of flow conveniently obtained, if desired, by connecting two or more units of the type shown in FIGS. 1 and 2, in parallel so that both have their inlet ports 9 supplied by the same source of particle-containing gas and both have their outlet ports 33 connected to suction sources. With both such suction sources operating in such connection, both units will effect filtering, and when one suction source is disconnected from the corresponding outlet port 33 and the port opened to the surrounding air, the suction applied from the other source will be communicated to the inlet port 9 of the housing disconnected from its own suction source, and will in this manner reverse the flow of gas.

The flexing of the filter tubes can also be effected by simultaneously changing the pressure in the individual cushions in the same manner, or by having different cushions undergo different changes so that the upper frame 14 goes through some twisting motions. In such a modification, the cushions on one side of the frame are connected to a pulsed pressure-decreasing source. The cushions can then be made of such inherent stiffness that in the absence of the pressure decrease they keep the filter tubes stretched by at least a small amount.

Opposing cushions (ref. FIG. 5) may also be utilized to obtain a similar effect by employing a constant pressure in the supporting cushion member and varying the pressure in the upper or opposing cushion. By such an arrangement a higher frequency is also obtained.

The apparatus of the present invention can be used for filtering all kinds of fluids.

Where the fluid being filtered would have an undesirable effect on the air cushion, as for example chemically react with or physically deteriorate the resilient element 23, the construction of FIG. 3 is particularly desirable since it removes this element from the interior of the housing. Flexible boot 21 also aids in protecting the cushion from such fluid. When filtering very hot gases, for instance, the filter tubes 12 can be made of glass, of synthetic fibers or the like since they are resistant to high temperatures, and the air cushions externally positioned and therefore, made of rubber or similar material that need not be resistant to the high temperatures within the housing. Instead of having the resilient members made of rubber, they can be made of other materials such as plastic, leather or the like, or the cushioning can be provided by piston and cylinder combinations constructed entirely of metal. Regardless of which of these alternative cushion arrangements is used, they are all free of mechanical working joints such as pivots, and they accordingly show an extremely long life with exceedingly little maintenance requirements. This is particularly important because commercial filter installations of this type are generally located where they are not easily reached for maintenance purposes, and in addition, the housings are usually packed full of filter tubes so that it is not a simple matter to conduct maintenance within the housing even when they are accessible.

The activating fluid employed in the present invention may be a gas or liquid such as air, nitrogen, water, commercial hydraulic fluids, or materials of similar nature well known to the art, provided they are inert and relatively stable under normal operating conditions.

The cleaning action is also improved by jarring or rapidly stopping the frame 14, preferably at the end of each of its upward movements. A convenient arrangement for accomplishing this is to mount one or more fixed limit stop above the frame member to limit its upward travel. The stops can provide metal-to-metal contact with the frame to give very abrupt action, or they can have a somewhat yieldable action as by being made of a block of dense rubber.

Since many changes and modifications can be made in the above-described details without departing from the nature and spirit of the invention, it is to be understood that the invention is not to be limited except as set forth in the appended claims.

What is claimed:

1. A dust collecting apparatus for filtering and collecting particulate matter from gas comprising a chamber, a floor in said chamber, spaced openings in said floor, a filter tube support frame positioned in the upper portion of said chamber, dust filter tubes supported by said frame means extending from the chamber wall at opposite ends of the chamber for supporting said frame, air cushions connecting the frame with said frame support wall extensions, individual means connected with each air cushion for inflating and deflating said cushion for flexing said dust filter tubes, means on said frame directly securing the upper ends of dust filter tubes thereto, means connecting the bottom ends of said dust filter tubes to the openings in the floor of said chamber, means for introducing dust laden gas to a point beneath said floor adjacent said floor openings, and means connected with said chamber for drawing the dust laden gas through the dust filter tubes and for withdrawing the dust-free gas from the chamber after it has passed through the dust filter tubes.

2. The apparatus of claim 1 wherein the frame supporting the dust filter tubes is formed of two elongated members extending longitudinally of the chamber adjacent the side walls thereof and cross bars connected with the elongated members which cross bars directly support the upper end of said dust filter tubes, said longitudinal members being connected at their ends with said air cushions.

3. The apparatus of claim 2 wherein said ends of said longitudinal members are connected with air cushions which are in turn connected with internal chamber wall extension means.

4. The apparatus of claim 2 wherein the ends of said longitudinal members extend through and beyond the chamber walls and are connected with air cushions positioned externally of the chamber, external chamber wall extension means being connected to said air cushions, and flexible seals are connected with the openings of the chamber wall through which the longitudinal members extend and to the longitudinal members themselves.

5. The apparatus of claim 4 wherein said cushions comprise pairs of upper and lower cushions, said external wall extension means being pairs of upper and lower chamber wall extension means, the ends of said longitudinal members being connected in sandwich manner to an upper and lower air cushion, and said cushions being also connected to upper and lower chamber wall extension means.

References Cited in the file of this patent

UNITED STATES PATENTS

| 1,153,751 | Beth | Sept. 14, 1915 |
| 2,143,664 | Snyder | Jan. 10, 1939 |
| 2,667,233 | Vedder | Jan. 26, 1954 |
| 2,850,112 | Dru | Sept. 2, 1958 |

FOREIGN PATENTS

| 1,056,494 | France | Oct. 21, 1953 |